(12) United States Patent
Dronet et al.

(10) Patent No.: US 10,513,150 B2
(45) Date of Patent: Dec. 24, 2019

(54) DIENE RUBBER/POLYPROPYLENE THERMOPLASTIC ELASTOMER COPOLYMER, COMPOSITIONS CONTAINING SAME, AND PREPARATION METHOD

(71) Applicant: COMPAGNIE GENERALE DES ETABLISSEMENTS MICHELIN, Clermont-Ferrand (FR)

(72) Inventors: Séverin Dronet, Clermont Ferrand (FR); Julien Thuilliez, Clermont Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 15/735,531

(22) PCT Filed: Jun. 16, 2016

(86) PCT No.: PCT/FR2016/051455
§ 371 (c)(1),
(2) Date: Dec. 11, 2017

(87) PCT Pub. No.: WO2016/203156
PCT Pub. Date: Dec. 22, 2016

(65) Prior Publication Data
US 2018/0170106 A1 Jun. 21, 2018

(30) Foreign Application Priority Data
Jun. 19, 2015 (FR) .................................. 15 55637

(51) Int. Cl.
| B60C 1/00 | (2006.01) |
| C08F 236/06 | (2006.01) |
| C08F 236/08 | (2006.01) |
| C08G 8/02 | (2006.01) |
| C08L 9/00 | (2006.01) |
| C08G 81/02 | (2006.01) |
| C08C 19/25 | (2006.01) |

(52) U.S. Cl.
CPC ............. *B60C 1/0016* (2013.01); *B60C 1/00* (2013.01); *C08C 19/25* (2013.01); *C08F 236/06* (2013.01); *C08F 236/08* (2013.01); *C08G 81/021* (2013.01); *C08L 9/00* (2013.01); *C08F 2500/02* (2013.01); *C08F 2500/21* (2013.01)

(58) Field of Classification Search
CPC .... C08F 236/00; C08F 236/02; C08F 236/04; C08F 236/06; C08F 236/08; C08F 2500/02; C08F 2500/21; C08G 1/00; C08G 81/021; C08L 9/00; C08C 19/25; B60C 1/00; B60C 1/0016
See application file for complete search history.

(56) References Cited

U.S. PATENT DOCUMENTS

| 5,342,886 A | 8/1994 | Glotin et al. |
| 5,541,262 A * | 7/1996 | Brichta ................. C08F 255/02 525/208 |
| 6,454,980 B1 * | 9/2002 | Siano .................... C08F 255/02 264/141 |
| 6,949,489 B1 | 9/2005 | Barbotin et al. |
| 2003/0004287 A1 | 1/2003 | Barbotin et al. |
| 2005/0239639 A1 | 10/2005 | Monteil et al. |
| 2006/0160969 A1 | 7/2006 | Boisson et al. |
| 2007/0149663 A1 | 6/2007 | Schmidt et al. |
| 2010/0022725 A1 | 1/2010 | Thuilliez et al. |
| 2016/0319061 A1 | 11/2016 | Matmour |
| 2017/0022296 A1 * | 1/2017 | Dire ....................... C08C 19/22 |

FOREIGN PATENT DOCUMENTS

| EP | 0964022 A1 | 12/1999 |
| EP | 1092731 A1 | 4/2001 |
| EP | 1092733 A1 | 4/2001 |
| EP | 1554321 A1 | 7/2005 |
| EP | 1656400 A1 | 5/2006 |
| EP | 1829901 A2 | 9/2007 |

(Continued)

OTHER PUBLICATIONS

International Search Report for PCT/FR2016/051455 dated Sep. 14, 2016.
French Preliminary Search Report for priority application No. FR 3037588 (two listed European references were previously cited in the IDS filed Dec. 11, 2017 at the time the application was filed).
Macromol. Symp. 2013, 330, 42-52; Emilee Cossoul, et al.: Homogeneous Copolymers of Ethylene with a (symbol)-olefins Synthesized with Metallocene Catalysts and Their Use as Standards for TREF Calibration.

(Continued)

*Primary Examiner* — Irina S Zemel
*Assistant Examiner* — Jeffrey S Lenihan
(74) *Attorney, Agent, or Firm* — Dickinson Wright PLLC

(57) ABSTRACT

The present invention relates to comb block copolymers, combining an elastomeric backbone and rigid pendent blocks and thus having thermoplastic elastomer properties. The invention targets in particular comb block copolymers which may be used as a material as is.

According to the invention, the comb block copolymer is a diene/polypropylene thermoplastic elastomer copolymer, characterized in that it consists of a backbone, said backbone being derived from a diene elastomer, and in that it comprises from 5% to 50% by weight, relative to the total weight of the copolymer, of pendent semicrystalline polypropylene groups distributed along the backbone.

Another subject of the invention is the process for preparing same, and the compositions comprising same.

Finally, a subject of the invention is a tire, one of the constituent elements of which comprises such a composition.

24 Claims, 1 Drawing Sheet

(56) References Cited

FOREIGN PATENT DOCUMENTS

| | | |
|---|---|---|
| EP | 1954705 A2 | 8/2008 |
| EP | 1957506 A2 | 8/2008 |
| EP | 2607102 A1 | 6/2013 |
| FR | 2815037 A1 | 4/2002 |
| FR | 3015488 A1 | 6/2015 |
| WO | 2005028256 A2 | 3/2005 |
| WO | 2005028526 A1 | 3/2005 |
| WO | 2007054224 A2 | 5/2007 |

OTHER PUBLICATIONS

Polymer 43 (2002), 2671-2676; A.S. Nielsen, et al.: Estimation of crystallinity of isotactic polypropylene using Raman spectroscopy.
Baker Hughes X-10082 Polypropylene Maleic Terminate Polymer.

* cited by examiner

DIENE RUBBER/POLYPROPYLENE THERMOPLASTIC ELASTOMER COPOLYMER, COMPOSITIONS CONTAINING SAME, AND PREPARATION METHOD

This application is a 371 national phase entry of PCT/FR2016/051455, filed 16 Jun. 2016, which claims benefit of French Patent Application No. 1555637, filed 19 Jun. 2015, the entire contents of which are incorporated herein by reference for all purposes.

BACKGROUND

1. Technical Field

The present invention relates to comb block copolymers, combining an elastomeric backbone and rigid pendent blocks and thus having thermoplastic elastomer properties. The invention targets in particular comb block copolymers which may be used as a material as is.

2. Related Art

Materials with thermoplastic elastomer properties combine the elastic properties of the elastomers and the thermoplastic nature, namely the ability to reversibly soften and harden under the action of heat, of the pendent blocks.

Generally, the grafting of polymer onto a polyolefin chain is predominantly used to prepare a copolymer which will serve as compatibilizer (it will then be used in a small amount in a formula) to improve the properties of blends based on polyolefins.

Thus, U.S. Pat. No. 5,342,886 describes the functionalization of an EPR (ethylene-propylene rubber) by maleic anhydride by reactive extrusion then grafting of polyamide by reactive extrusion. The copolymer obtained in this way is used in minor amounts in compositions to compatibilize mixtures of incompatible polymers.

The grafting of polyamide to a polyolefin to obtain a copolymer of use as a material has already been described. Thus, patent FR 2 815 037 describes the grafting of polyamide to polyethylene-co-acrylate-co-maleic anhydride (Lotader®) terpolymers by reactive extrusion to obtain flexible polyolefins with improved thermomechanical strength properties.

Within the context of the invention, a material with thermoplastic elastomer properties is sought, based mainly on low-cost, high-utility monomers. A material is also sought, which can be produced by a continuous, flexible and low-cost process, such as, for example, by reactive extrusion. Reactive extrusion is a process used primarily for thermoplastics, thus for polymers having high glass transition temperatures or melting points, where appropriate.

DETAILED DESCRIPTION OF EXAMPLE EMBODIMENTS

Figure 1:
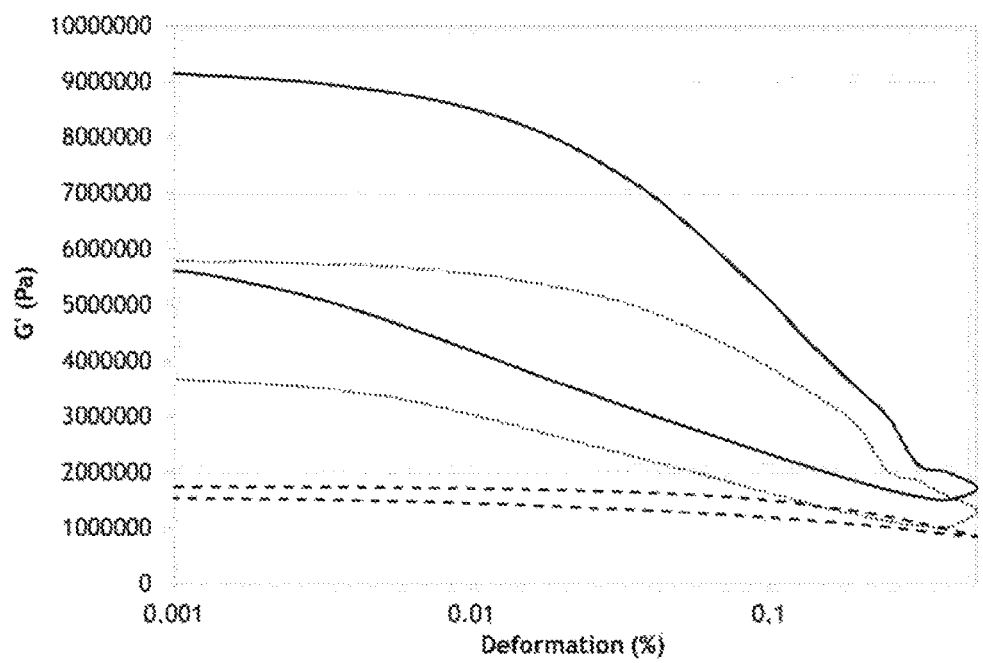
FIG. 1: Elastic modulus G' (in Pa) as a function of deformation (%)
Dashed line: ML1, dotted line: ML2, solid line: ML3

Any interval of values denoted by the expression "between a and b" represents the range of values extending from more than a to less than b (that is to say, limits a and b excluded), whereas any interval of values denoted by the expression "from a to b" means the range of values extending from a to b (that is to say, including the strict limits a and b).

In the present description, unless expressly indicated otherwise, all the percentages (%) shown are percentages by weight.

Moreover, for the purposes of the invention, the term "phr" means parts by weight per hundred parts of total elastomer, therefore including the diene/polypropylene thermoplastic elastomer copolymer according to the invention.

In the present description, the term "along the chain", referring to a group which is pendent from the polymer, should be understood to mean that the polymer comprises pendent groups of this type in several places on the chain. This includes the end(s) of the chain, but is not limited to these locations. When a group is present at at least one chain end, the polymer also comprises at least one other pendent group of this type at another position in the chain.

In the present description, the term "graft" should be understood to mean the polypropylene side group attached to the backbone of the diene elastomer by grafting.

A subject of the invention is a diene/polypropylene thermoplastic elastomer copolymer, characterized in that it consists of a backbone, said backbone being derived from a diene elastomer, and in that it comprises 5% to 50% by weight, relative to the total weight of the copolymer, of pendent semicrystalline polypropylene groups distributed along the backbone.

The thermoplastic elastomer copolymer according to the invention comprises a diene backbone which affords it elastomeric properties, and pendent polypropylene blocks which afford it thermoplastic and elastic properties.

The thermoplastic elastomer copolymer may also be named TPE.

Structure of the TPE (Copolymer According to the Invention):

The TPE comprises polypropylene blocks distributed along the backbone. More particularly, the copolymer more advantageously comprises from 5 to 30%, even more advantageously from 10 to 30% by weight, relative to the total weight of the copolymer, of polypropylene blocks.

The TPE according to the invention withstands very large deformations before breaking, but may flow at a temperature greater than the melting point of the polypropylene.

In particular, the copolymer according to the invention has an elongation at break of at least 140%, as measured by the method described on page 23, in the "mechanical tests" paragraph.

The copolymer may be prepared by any suitable process, in particular by grafting. Advantageously, the semicrystalline polypropylene blocks are grafted to the backbone. Thus, the copolymer is prepared by grafting polypropylene blocks to a diene elastomer chain A. To enable this grafting, the diene elastomer chain A comprises functionalized units.

For the purposes of the invention, "functionalized unit" is intended to mean a unit comprising a pendent functional group. This group is able to react with the end group of the functionalized polypropylene.

The following terms will be used below:
"diene elastomer" to generically denote the elastomer from which the TPE backbone according to the invention is derived;
"diene elastomer A" to denote the diene elastomer which comprises functionalized units which are able to react with the end group of the functionalized polypropylene;

"diene elastomer B" to denote the diene elastomer which will subsequently be functionalized to give the diene elastomer A.

More particularly, the thermoplastic elastomer copolymer according to the invention is obtained by reaction:
- of a diene elastomer A comprising pendent functional groups along said elastomer, which are able to react with the end group of the polypropylene;
- of functionalized semicrystalline polypropylene as described below.

In particular, the copolymer is obtained by reaction:
- of a diene elastomer A comprising pendent epoxide groups along said elastomer;
- of semicrystalline polypropylene functionalized by an end group able to react with the pendent epoxide groups of the diene elastomer A.

These copolymers are comb block copolymers combining a diene elastomer backbone, which constitutes the soft block, and rigid grafts, which constitute the hard blocks. The grafting of polypropylene makes it possible to confer a thermoplastic nature upon the copolymer. In this variant, the TPE is obtained by reaction of the functions present on the diene elastomer with the end group present on the polypropylene grafts.

Detailed Description of the Diene Elastomer

In the following text, the variant, according to which the TPE is prepared by grafting onto a diene elastomer A, is described in detail.

The diene elastomer A has a degree of crystallinity within a range extending from 0 to 10%. Advantageously, the elastomer is amorphous.

The diene elastomer A has a number-average molar mass ranging from 10 kg/mol to 500 kg/mol, so as to confer, on the TPE, good elastomeric properties and a mechanical strength which is sufficient and compatible with the use especially as tire tread. The molar mass is determined by the attached described method.

The diene elastomer A advantageously has a number-average molar mass ranging from 10 kg/mol to 300 kg/mol, more advantageously from 30 kg/mol to 100 kg/mol.

The diene elastomer A comprises units bearing functional groups which are able to react with the end group of the polypropylene. Advantageously, such a functional group is chosen from epoxide, acid anhydride or carboxylic acid functional groups, more particularly epoxide functional groups.

In a first embodiment, the diene elastomer A is the product of the functionalization by grafting of a diene elastomer B. The functionalization is advantageously a hydrosilylation. A process for functionalization of a diene polymer with pendent epoxide groups was, for example, described in application FR 13/62946.

In this embodiment, the epoxide groups are advantageously attached to the diene elastomer A via a silicon atom. The epoxide group advantageously corresponds to the following formula I:

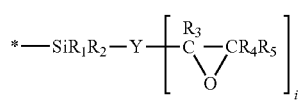

Formula I where
- $R_1$ and $R_2$, which are identical or different, each represent a $C_1$-$C_5$ alkyl, $C_6$-$C_{14}$ aryl, or $C_7$-$C_{11}$ aromatic alkyl group;
- $R_3$, $R_4$ and $R_5$, which are identical or different, each represent a hydrogen atom or a $C_1$-$C_5$ alkyl, $C_6$-$C_{14}$ aryl, or $C_7$-$C_{11}$ aromatic alkyl group, and preferentially a hydrogen atom;
- Y is a bridging group with a valency equal to i+1; and
- i is an integer with a value from 1 to 3, and preferentially 1;
- * denotes an attachment point to the elastomer chain.

Rx denotes one or more of $R_1$ and $R_2$, $R_3$, $R_4$ or $R_5$.

In the formula I, when Rx denotes an alkyl radical, the latter comprises 1 to 5 carbon atoms, preferably 1 to 4, more preferentially 1 to 3 carbon atoms. Mention may be made, by way of example, of methyl, ethyl and propyl radicals.

In the formula I, when Rx denotes an aryl radical, the latter comprises 6 to 14 carbon atoms. Mention may be made, by way of example, of phenyl, naphthyl and anthracenyl radicals.

In the formula I, when Rx denotes an aromatic alkyl radical, the latter comprises 7 to 11 carbon atoms. Mention may be made, by way of example, of benzyl, tolyl and xylyl radicals.

According to variants, in the formula I, $R_3$, $R_4$ and $R_5$ are preferably identical and represent a hydrogen atom.

According to other variants, in the formula I, $R_1$ and $R_2$, which are identical or different, preferably denote a $C_1$-$C_5$ alkyl group.

According to yet other variants, in the formula I, Y preferentially represents a linear, branched or cyclic hydrocarbon-based chain which may contain one or more aromatic radicals and/or one or more heteroatoms, such as, for example, N, O or Si. According to a preferred embodiment, the bridging group Y is a linear or branched $C_1$-$C_{24}$, preferably $C_1$-$C_{10}$ alkyl chain, optionally interrupted by one or more silicon and/or oxygen atoms. Y is more preferentially a linear $C_1$-$C_6$ alkyl chain interrupted by one or more silicon and/or oxygen atoms. When the hydrocarbon-based chain Y comprises at least one silicon atom, the latter may be preferentially substituted by at least one $C_1$-$C_4$ alkyl radical, preferably methyl or ethyl. When the hydrocarbon-based chain Y comprises at least one oxygen atom, the latter is preferably separated from the epoxy group by a methylene group.

In the formula I, i preferably equals 1.

According to particularly advantageous variants, the group of formula I has at least one of the four following features, preferably all four:
- $R_1$ and $R_2$, which are identical or different, denote a $C_1$-$C_5$ alkyl radical, preferably methyl and ethyl,
- $R_3$, $R_4$ and $R_5$ are identical and represent a hydrogen atom,
- Y is a linear $C_1$-$C_6$ alkyl chain interrupted by at least one oxygen atom separated from the epoxy group by a methylene group and by at least one silicon atom substituted by two identical or different $C_1$-$C_5$ alkyl radicals, preferably methyl and ethyl,
- i equals 1.

Thus, according to certain particularly advantageous variants, the group of formula I corresponds to one of the following formulae IA, IB and IC:

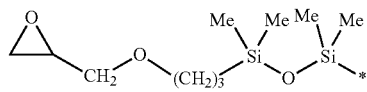

IA

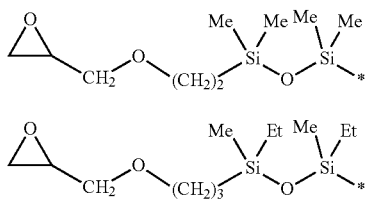

IB

IC

* denoting in each of these formulae a point of attachment to the polymer chain.

The degree of grafting of the group of formula I to the diene elastomer B may be adjusted in a way known to those skilled in the art, by varying various operating conditions, such as, especially, the amount of molecules to be grafted, the temperature or else the reaction time. It is possible to achieve quantitative grafting yields.

Thus, the degree of grafting is preferably at least 0.1 mol % of groups of formula I relative to the modified elastomer. The degree of grafting is preferably at most 50 mol % of groups of formula I relative to the modified elastomer, and according to some variants the degree of grafting is less than 20 mol % of groups of formula I relative to the modified elastomer.

We will now describe the elastomer before functionalization in detail, denoted, for the purposes of clarity, "diene elastomer B" or "elastomer B".

A diene elastomer should be understood, according to the invention, to mean any polymer resulting at least in part (i.e., a homopolymer or a copolymer) from diene monomers (monomers bearing two conjugated or non-conjugated carbon-carbon double bonds). The diene elastomer B according to the invention comprises unsaturations of the carbon-carbon double bond type. The diene elastomer B preferably has, among other unsaturations, pendent unsaturations along the chain. According to some variants, these pendent unsaturations are unsaturations which are said to be of vinyl origin. Unsaturations of vinyl origin refer to pendent unsaturations of the polymer chain originating from an insertion of vinyl type of the diene monomer into the polymer. By way of examples of unsaturations of vinyl origin, mention may be made of those originating from an insertion of 1,2-type, for example of butadiene, isoprene or any other diene having a C1 unsaturation (that is to say any other diene in which one of the double bonds is terminal), or else insertions of 3,4-type, of isoprene, for example.

The diene elastomer B able to be used in the invention is most particularly a diene polymer corresponding to one of the following categories:
(a) any homopolymer obtained by polymerization of a conjugated diene monomer having from 4 to 12 carbon atoms;
(b) any conjugated diene copolymer.

The following are especially suitable as conjugated dienes: 1,3-butadiene, 2-methyl-1,3-butadiene, 2,3-di($C_1$-$C_5$alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. Mention may be made in particular of the 1,3-dienes, more particularly 1,3-butadiene, 2-methyl-1,3-butadiene, 2,3-dimethyl-1,3-butadiene, an aryl-1,3-butadiene, or 1,3-pentadiene. Preference is particularly given to 1,3-butadiene or 2-methyl-1,3-butadiene.

Advantageously, the diene elastomer B contains 1,3-diene units, in particular butadiene or 2-methyl-1,3-butadiene.

In the diene elastomer B, the molar content of units resulting from the diene is greater than 10%, advantageously greater than or equal to 25%. It may be 100% for a homopolymer. In particular, the diene elastomer B is a homopolymer of 1,3-diene.

The homopolymer may be obtained by anionic, Ziegler-Natta, or radical polymerization, or polymerization with metallocene-based catalytic systems (EP 1 092 733).

The elastomer B may be a random copolymer resulting from the polymerization of one or more conjugated dienes with one or more compounds chosen from aliphatic α-monoolefins, aromatic α-monoolefins and ethylene. In particular, the elastomer B is a random copolymer resulting from the polymerization of one or more 1,3-dienes with one or more compounds chosen from aliphatic α-monoolefins, aromatic α-monoolefins and ethylene.

According to a first variant, the diene elastomer B is a random copolymer resulting from the polymerization of at least one or more conjugated dienes and of aromatic α-monoolefin compounds.

Such copolymers typically contain from 20 to 99% by weight of units resulting from conjugated diene and from 1 to 80% by weight of units resulting from the aromatic α-monoolefin monomer.

The above-defined dienes are suitable as conjugated dienes, in particular the 1,3-dienes.

Vinylaromatic compounds advantageously having from 8 to 20 carbon atoms are suitable as aromatic α-monoolefin monomer. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

Preferentially, the diene elastomer B is selected from the group consisting of polybutadienes (BRs), polyisoprenes, in particular synthetic polyisoprenes (IRs), butadiene copolymers, isoprene copolymers and mixtures of these elastomers. Such copolymers are more preferentially selected from the group consisting of butadiene/styrene copolymers (SBRs) whether the latter are prepared by emulsion polymerization (ESBR) or solution polymerization (SSBR), isoprene/butadiene copolymers (BIRs), isoprene/styrene copolymers (SIRs) and isoprene/butadiene/styrene copolymers (SBIRs).

These copolymers may be synthesized by anionic or radical polymerization (for example emulsion or solution polymerization) according to processes well known to those skilled in the art.

According to a second variant, the diene elastomer B is a random copolymer resulting from the polymerization of at least one or more conjugated dienes and of aliphatic α-monoolefin compounds.

The above-defined dienes are suitable as conjugated dienes, in particular the 1,3-dienes.

The aliphatic α-monoolefin monomer advantageously comprises from 3 to 18 carbon atoms. The aliphatic α-monoolefin monomers are advantageously chosen from propene, butene, hexene and octene. Such copolymers may be prepared in the presence of metallocene-based catalytic systems, such as, for example, by the process described in the application WO 2005/028256.

According to a third variant, the diene elastomer B is a random copolymer resulting from the polymerization of at least one or more conjugated dienes and ethylene. In particular, the diene elastomer B is a random copolymer resulting from the polymerization of at least one or more 1,3-dienes and ethylene.

The elastomer B comprises units resulting from ethylene and units resulting from conjugated diene comprising a carbon-carbon double bond, which units are distributed randomly within said elastomer.

According to one embodiment of this variant of the invention, the units resulting from ethylene present in the elastomer B represent at least 50 mol % of all the monomer units of said elastomer.

Advantageously, the diene elastomer B comprises units which have, as subunit, a divalent hydrocarbon-based ring containing 6 carbon atoms, of 1,2-cyclohexane type. The molar content of such units is advantageously greater than or equal to 20% relative to all the units resulting from the conjugated diene.

According to a particular embodiment of this variant of the invention, the elastomer B comprises the following units UA, UB, UC and UD, distributed randomly within said elastomer, UA) —$CH_2$—$CH_2$— according to a molar percentage of m %

UB) —$CH_2$—$R_6C$=$CR_7$—$CH_2$— according to a molar percentage of n %

UC)

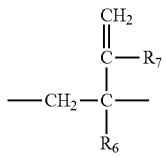

according to a molar percentage of o %

UD)

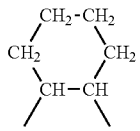

according to a molar percentage of p %

$R_6$ and $R_7$, which are identical or different, each represent a hydrogen atom, a methyl radical or a phenyl radical which is unsubstituted or substituted in the ortho, meta or para position by a methyl radical, advantageously $R_6$ and $R_7$ each represent a hydrogen $m \geq 50$ $0 < o+p \leq 25$ $n+o > 0$ m, n, o and p being numbers ranging from 0 to 100 the respective molar percentages of m, n, o and p being calculated on the basis of the sum of m+n+o+p, which is equal to 100.

According to another particular embodiment of this variant of the invention, the elastomer B also contains units UE distributed randomly within said elastomer:

UE)

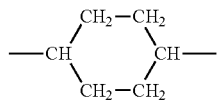

according to a molar percentage of q %

$o+p+q \geq 10$ $q \geq 0$ the respective molar percentages of m, n, o, p and q being calculated on the basis of the sum of m+n+o+p+q, which is equal to 100.

Whereas the subunit of the unit UD forms a divalent hydrocarbon-based ring containing 6 carbon atoms of 1,2-cyclohexane type, the subunit of the unit UE forms a divalent hydrocarbon-based ring containing 6 carbon atoms of 1,4-cyclohexane type.

According to another embodiment of this variant of the invention, the elastomer B also contains units UF distributed randomly within the elastomer:

UF)

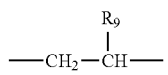

according to a molar percentage of r %

* $R_9$ denoting an alkyl radical having from 1 to 4 carbon atoms or an aryl radical, $0 \leq r \leq 25$, preferably $0 \leq r \leq 10$, the respective molar percentages of m, n, o, p and r being calculated on the basis of the sum of m+n+o+p+r, which is equal to 100.

According to this particular embodiment of this variant of the invention, the elastomer B may comprise q % of units UE distributed randomly within the elastomer, in which case the respective molar percentages of m, n, o, p, q and r are calculated on the basis of the sum of m+n+o+p+q+r, which is equal to 100.

It is understood that the elastomer B can consist of a mixture of elastomers which contain the units UA, UB, UC, UD, UE and UF according to the respective molar percentages m, n, o, p, q and r as defined above and which differ from one another in their macrostructure or their microstructure, in particular in the respective molar contents of the units UA, UB, UC, UD, UE and UF.

According to any one of the embodiments of this variant of the invention, preferably the elastomer B does not contain any units UF.

According to one embodiment of this variant of the invention, at least one of the two molar percentages p and q is preferably other than 0. In other words, the diene elastomer B preferably contains at least one of the subunits which are a divalent hydrocarbon-based ring containing 6 carbon atoms of 1,2-cyclohexane type and a divalent hydrocarbon-based ring containing 6 carbon atoms of 1,4-cyclohexane type. More preferentially, p is strictly greater than 0.

According to one embodiment of this variant of the invention, the elastomer B has at least one, and preferentially all, of the following criteria:

$m \geq 65$ $n+o+p+q \geq 15$, more preferably still 20

$10 \geq p+q \geq 2$ $1 \geq n/(o+p+q)$ when q is non-zero, $20 \geq p/q \geq 1$ According to another preferential embodiment of this variant of the invention, the elastomer B contains, as units, only the units UA, UB, UC, UD and UE according to their respective molar percentage m, n, o, p and q, preferably all other than 0.

According to another preferential embodiment of this variant of the invention, the elastomer B contains, as units, only the units UA, UB, UC, and UD according to their respective molar percentage m, n, o, and p, preferably all other than 0.

According to any one of the embodiments of this variant of the invention, the units UB present in the elastomer B preferably have the trans configuration represented by the following formula:

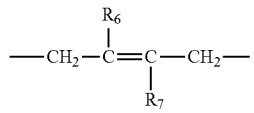

where $R_6$ and $R_7$ are as defined above.

The elastomer B may be obtained according to various synthesis methods known to those skilled in the art, especially as a function of the targeted values of m, n, o, p, q and r. Generally, the elastomer B may be prepared by copolymerization of at least one conjugated diene monomer and ethylene and according to known methods of synthesis, in particular in the presence of a catalytic system comprising a metallocene complex. In this respect, mention may be made of the catalytic systems based on metallocene complexes, which catalytic systems are described in the documents EP 1 092 731 A1, EP 1 554 321 A1, EP 1 656 400 A1, EP 1 829 901 A1, EP 1 954 705 A1 and EP 1 957 506 A1 in the name of the Applicants.

1,3-dienes are suitable as conjugated dienes, in particular 1,3-butadiene.

Thus, according to some of these methods of synthesis, the elastomer B may be obtained by copolymerization of at least one conjugated diene monomer and of ethylene, in the presence of a catalytic system comprising a lanthanide metallocene complex with ansa ligands of fluorenyl type. In this respect, mention may be made of the metallocene complexes described in the documents EP 1 092 731 A1, EP 1 554 321 A1 and EP 1 954 705 A1.

The elastomer B which contains units UF according to a particular embodiment of this variant of the invention may be obtained by copolymerization of at least one conjugated diene monomer and of two olefins, such as ethylene and an α-olefin, in the presence of a catalytic system comprising a lanthanide metallocene complex with ligands of ansa cyclopentadienyl-fluorenyl type. For example, an α-olefin having from 3 to 18 carbon atoms, advantageously having from 3 to 6 carbon atoms, is suitable as α-olefin monomer. Mention may be made of propylene, butene, pentene, hexene or a mixture of these compounds. Mention may also be made, as termonomer used in combination with at least one conjugated diene monomer and ethylene, of a styrene derivative. The catalytic systems based on metallocene complexes can be those described in the documents EP 1 092 731 A1, EP 1 656 400 A1, EP 1 829 901 A1 and EP 1 957 506 A1 in the name of the Applicants.

The elastomer B may be prepared in accordance with the abovementioned documents by adjusting the polymerization conditions by means known to those skilled in the art, so as to achieve desired number-average molar mass (Mn) values.

In a second embodiment, the functional group may be introduced by copolymerization of the conjugated diene monomers, especially 1,3-diene with monomers bearing such a functional group.

Thus, the diene elastomer A is advantageously the product of the copolymerization of at least one conjugated diene monomer and at least one monomer bearing said functional group.

The following are especially suitable as conjugated dienes: 1,3-butadiene, 2-methyl-1,3-butadiene, 2,3-di($C_1$-$C_5$alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. Preference is particularly given to butadiene or 2-methyl-1,3-butadiene.

The following are especially suitable as functionalized monomer:

aliphatic glycidyl esters and ethers such as allyl glycidyl ether, vinyl glycidyl ether, glycidyl maleate and itaconate, glycidyl acrylate and methacrylate, alicyclic glycidyl esters and ethers such as 2-cyclohexene-4,5-diglycidyl carboxylate, cyclohexene-4-glycidyl carboxylate, 5-norbornene-2-methyl-2-glycidyl carboxylate and endo-cis-bicyclo(2,2,1)-5-heptene-2,3-diglycidyl dicarboxylate, maleic, itaconic, citraconic, allylsuccinic, cyclohex-4-ene-1,2-dicarboxylic, 4-methylenecyclohex-4-ene-1,2-dicarboxylic, bicyclo(2,2,1)hept-5-ene-2,3-dicarboxylic and x-methylbicyclo(2,2,1)hept-5-ene-2,2-dicarboxylic anhydrides.

Other monomers may also be copolymerized with these monomers, said other monomers being in particular selected from aliphatic α-monoolefin monomers, aromatic α-monoolefin monomers and ethylene, as defined above. These units are randomly distributed in the elastomer A.

Detailed Description of the Polypropylene Blocks:

In the following text, the variant according to which these blocks are grafts is described in detail.

The polypropylene blocks are semicrystalline. Thus, they have a degree of crystallinity advantageously of between 20% and 80%, more advantageously of between 50% and 70%.

The blocks are advantageously derived from semicrystalline polymers having a number-average molar mass of less than 10 000 g/mol, preferably ranging from 1000 g/mol to 8500 g/mol.

The molar mass is measured according to the attached described method.

Use will be made, for the definition of the thermoplastic blocks, of the characteristic of melting point (M.p.) of the rigid thermoplastic block. This characteristic is well known to those skilled in the art.

The polypropylene block preferably has an M.p. of greater than or equal to 80° C. Preferentially, this thermoplastic block has an M.p. within a range extending from 80° C. to 250° C. Preferably, the M.p. of this polypropylene block is preferentially from 100° C. to 200° C., more preferentially from 100° C. to 180° C.

Advantageously, the grafts are derived from semicrystalline polymers having a number-average molar mass of less than 10 000 g/mol, preferably ranging from 1000 to 8500 g/mol, and a melting point ranging from 80° C. to 250° C., more advantageously from 100° C. to 200° C., even more advantageously from 100° C. to 180° C.

The blocks are advantageously derived from polypropylene terminated by an end group. Advantageously, the polypropylene only has one functional end group. The end group able to react with the functions present on the elastomer is advantageously an anhydride, in particular maleic anhydride, an epoxy, a carboxylic acid or an alcohol. Advantageously, the blocks are derived from maleic monoanhydride-terminated semicrystalline polypropylene polymers.

Production Process:

Another subject of the invention is a process for producing a copolymer according to the invention.

In a preferred variant of the invention, the copolymer is prepared by grafting polypropylene blocks onto a diene elastomer. The grafting may be carried out by any process known to those skilled in the art, in particular by reactive extrusion.

In an advantageous variant, the production process comprises the reaction:
- of a diene elastomer A comprising units resulting from the polymerization of a conjugated diene and also comprising functions which are able to react with the end group of the polypropylene, which are pendent along the chain;
- of semicrystalline polypropylene functionalized by an end group able to react with the functions present on the elastomer in proportions by weight of elastomer/polypropylene ranging from 60/40 to 95/5 in solution, or by bringing into contact in the melt state, in the absence of solvent, in particular in an extruder.

The reaction is advantageously carried out in a continuous extruder-reactor. This is then referred to as a reactive extrusion process.

The functions which are able to react with the end group of the polypropylene are advantageously epoxide functions.

Advantageously, the elastomer is reacted with the polypropylene by bringing into contact in the melt state at a temperature ranging from 100° C. to 200° C., for example in an extruder.

During this process, additives may also be introduced, in particular one or more catalysts for the grafting reaction. Such catalysts make it possible to increase the amount of grafted polypropylene. The catalysts may be imidazoles, in particular 1-butyl-2-(5'-methyl-2'-furoyl)imidazole.

During this process, advantageously at least 10% by weight of the polypropylene introduced is grafted onto the elastomer.

The TPE obtained by this process is as described above. The mixture comprising same may also comprise unreacted polypropylene and diene elastomer, and where appropriate catalysts for the grafting reaction.

Another subject of the invention is the TPE obtained by the process according to the invention, described above.

Another subject of the invention is the mixture obtained by the process according to the invention, described above. This mixture comprises TPE and may also comprise unreacted polypropylene and elastomer, and where appropriate catalysts for the grafting reaction.

Compositions:

Another subject of the invention is a composition comprising at least 50% by weight of a TPE according to the invention. Another subject of the invention is a composition comprising the mixture obtained by the process according to the invention, advantageously in an amount of at least 50% by weight. In particular, the TPE or the mixture according to the invention may be the predominant polymer by weight of the composition, or even the only polymer of the composition.

The composition is advantageously a rubber composition, in particular a composition of use in the manufacture of a tire. The TPE or the mixture according to the invention is particularly useful for the preparation of tread compositions. The TPE or the mixture according to the invention makes it possible to manufacture a tread, making it possible to obtain a very good compromise of grip and rolling resistance performance.

If optional other elastomers are used in the composition, the TPE(s) in accordance with the invention or the elastomers of the mixture according to the invention constitute the predominant fraction by weight; they then represent at least 65%, preferably at least 70% by weight and more preferentially at least 75% by weight of all the elastomers present in the composition. Also preferentially, the TPE(s) according to the invention or the elastomers of the mixture according to the invention (TPE+unreacted elastomer) represent at least 95% (in particular 100%) by weight of all the elastomers present in the composition.

Thus, the amount of TPE in accordance with the invention or of elastomers of the mixture according to the invention is within a range which varies from 65 to 100 phr, preferentially from 70 to 100 phr and especially from 75 to 100 phr. Also preferentially, the composition contains from 95 to 100 phr of TPE according to the invention or of elastomers of the mixture according to the invention. The TPE(s) according to the invention or the elastomers of the mixture according to the invention are preferentially the only elastomer(s) of the rubber composition, in particular of the tread.

The TPE(s) according to the invention or the mixture according to the invention are sufficient by themselves for the tread according to the invention to be usable.

The composition according to the invention may also comprise at least one (that is to say one or more) other diene rubber as non-thermoplastic elastomer.

The total content of this other optional additional diene rubber is within a range extending from 0 to 35 phr, preferentially from 0 to 30 phr, more preferentially from 0 to 25 phr and more preferentially still from 0 to 5 phr. Also very preferentially, the composition according to the invention does not contain any other additional diene rubber.

Second "diene" elastomer or rubber should be understood, in a known way, as meaning an (one or more is understood) elastomer resulting at least in part (i.e., a homopolymer or a copolymer) from diene monomers (monomers bearing two conjugated or non-conjugated carbon-carbon double bonds).

Second diene elastomer should be understood, according to the invention, as meaning any synthetic elastomer resulting, at least in part, from diene monomers. More particularly, second diene elastomer is understood as meaning any homopolymer obtained by polymerization of a conjugated diene monomer having from 4 to 12 carbon atoms or any copolymer obtained by copolymerization of one or more conjugated dienes with one another or with one or more vinylaromatic compounds having from 8 to 20 carbon atoms. In the case of copolymers, the latter contain from 20% to 99% by weight of diene units and from 1% to 80% by weight of vinylaromatic units. The following are especially suitable as conjugated dienes of use in the process in accordance with the invention: 1,3-butadiene, 2-methyl-1,3-butadiene, 2,3-di(C1 to C5 alkyl)-1,3-butadienes, such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, phenyl-1,3-butadiene, 1,3-pentadiene or 2,4-hexadiene, etc.

The second diene elastomer of the composition in accordance with the invention is preferentially selected from the group of diene elastomers consisting of polybutadienes, synthetic polyisoprenes, natural rubber, butadiene copolymers, isoprene copolymers and the mixtures of these elastomers. Such copolymers are more preferably selected from the group consisting of styrene copolymers (SBR, SIR and SBIR), polybutadienes (BR) and natural rubber (NR).

Nanometric or Reinforcing Filler

The TPE(s) or the mixture according to the invention are sufficient by themselves for the composition according to the invention, in particular the tread, to be usable.

When a reinforcing filler is used, use may be made of any type of filler commonly used for the manufacture of tires, for example an organic filler, such as carbon black, an inorganic filler, such as silica, or else a blend of these two types of filler, in particular a blend of carbon black and silica.

In order to couple the reinforcing inorganic filler to the elastomer, it is possible, for example, to use an at least bifunctional coupling agent (or bonding agent) intended to provide a satisfactory connection, of chemical and/or physical nature, between the inorganic filler (surface of its particles) and the elastomer according to the invention, in particular bifunctional polyorganosiloxanes or organosilanes.

Plasticizers

The TPE(s) or the mixture according to the invention are sufficient by themselves for the composition according to the invention, in particular the tread, to be usable.

Nonetheless, according to one preferential embodiment of the invention, the composition may also comprise a plasticizing agent, such as an oil (or a plasticizing or extending oil), or a plasticizing resin, the role of which is to facilitate the processing of the tread, in particular its incorporation in the tire, by lowering the modulus and increasing the tackifying power.

Various Additives

The composition may moreover also comprise the various additives customarily present in compositions for tires, in particular treads, known to those skilled in the art. The choice will be made, for example, of one or more additives chosen from protection agents, such as antioxidants or antiozonants, UV stabilizers, the various processing aids or other stabilizers, or else promoters capable of promoting the adhesion to the remainder of the structure of the tire. Preferentially, the composition does not contain all these additives at the same time and, more preferably still, the composition does not contain any of these agents.

In one advantageous variant of the invention, mention will most particularly be made of antioxidants and nucleating agents. The nucleating agents may in particular be selected from 1,3,5-tris(2,2-dimethylpropionylamino)benzene, the amides described in U.S. Pat. No. 7,790,793 B2, 1,2,3-trideoxy-4,6:5,7-bis-O-[(4-propylphenyl)methylene] nonitol (TBPMN), Milliken Hyperform® HPN-20, Milliken Hyperform® HPN-68L, Milliken Hyperform® HPN-600ei, Milliken Millad® NX™ 8000.

Equally and optionally, the composition may contain a crosslinking system known to those skilled in the art. Preferentially, the composition does not contain a crosslinking system. Similarly, the composition may contain one or more inert micrometric fillers, such as lamellar fillers, known to those skilled in the art. Preferably, the composition does not contain a micrometric filler.

Another subject of the invention is a tire, one of the constituent elements of which comprises a composition according to the invention. This constituent element is advantageously the tread.

This tread may be mounted on a tire in a conventional way, said tire comprising, in addition to the tread according to the invention, a crown, two sidewalls and two beads, a carcass reinforcement anchored to the two beads, and a crown reinforcement. Optionally, the tire according to the invention may also comprise an underlayer or an adhesion layer between the patterned portion of the tread and the crown reinforcement.

A subject of the invention is in particular a tire comprising a tread, a crown with a crown reinforcement, two sidewalls, two beads, a carcass reinforcement anchored to the two beads and extending from one sidewall to the other, in which the tread comprises at least one thermoplastic elastomer, said thermoplastic elastomer being a copolymer according to the invention, and the total content of thermoplastic elastomer being within a range extending from 65 to 100 phr (parts by weight per hundred parts of elastomer).

Preparation

The TPEs or the mixture according to the invention may be processed in the conventional way for TPEs, by extrusion or moulding, for example using a starting material available in the form of beads or granules.

The tread for the tire according to the invention may be prepared by incorporating the various components into a mixer, then using a die which makes it possible to produce the profile element. The tread pattern is then applied in the mould for curing the tire. The various components may for example be the functional polypropylene and the diene elastomer according to the invention, which are described above, where appropriate, catalysts for the grafting reaction and/or one or more of the other additives described above. The various components may also be the TPE according to the invention or a mixture according to the invention, a second diene rubber as are described above, and where appropriate one or more of the other additives described above.

The mixer may for example be a twin-screw extruder, so as to melt the matrix and the grafts and incorporate all the ingredients.

The abovementioned characteristics of the present invention, and also others, will be better understood on reading the following description of several exemplary embodiments of the invention, given by way of illustration and without limitation, in relation to the appendices.

Measurements and Tests Used

1. Size Exclusion Chromatography

Preparation of the polymer: There is no specific treatment of the polymer sample before analysis. The latter is simply dissolved in (tetrahydrofuran+1 vol % of distilled water) at a concentration of approximately 1 g/l. The solution is then filtered through a filter with a porosity of 0.45 µm before injection.

SEC analysis: The apparatus used is a Waters Alliance chromatograph. The elution solvent is tetrahydrofuran. The flow rate is 0.7 ml/min, the temperature of the system is 35° C. and the analytical time is 90 min. A set of four Waters columns in series, with commercial names Styragel HMW7, Styragel HMW6E and two Styragel HT6E, is used.

The volume of the solution of the polymer sample injected is 100 µl. The detector is a Waters 2410 differential refractometer and the software for making use of the chromatographic data is the Waters Empower system.

The calculated average molar masses are relative to a calibration curve produced from PSS Ready Cal-Kit commercial polystyrene standards.

The conditions can be adjusted by those skilled in the art.

2. Determining the Molar Mass Distribution of the PP Grafts by High-Temperature Size Exclusion Chromatography (HT-SEC):

The HT-SEC analyses are carried out on a Viscotek (Malvern Instruments) system fitted with 3 columns (Polefin 300 mm×8 mm I. D. from Polymer Standards Service, porosity of 1000 Å, 100 000 Å and 1 000 000 Å). 200 µl of a solution at a concentration of 5 mg/ml of polymer are eluted in 1,2,4-trichlorobenzene at a flow rate of 1 ml/min at 150° C. The mobile phase is stabilized with 2,6-di(tert-butyl)-4-methylphenol (200 mg l$^{-1}$). On-line detection is used, with a differential refractive index (RI) detector, a low-angle (7°, LALS) and right-angle (90°, RALS) light scattering (LS) detector and a 4 capillary differential viscometer.

A conventional calibration curve, obtained with polyethylene standards (Polymer Standards Service, Mainz, Germany) ranging from 500 to 100 000 g·mol-1, is used to calculate the molar mass distribution of the samples.

The absolute number-average molar masses are calculated from the RALS/LALS and RI detector signals and using the increment in the index (dn/dc) of the polyethylene.

The OmniSEC 5.02 software from Malvern Instruments is used for the calculations.

The method is described in the reference Macromol. Symp. 2013, 330, 42-52.

3. Viscosity:

The Mooney viscosity ML(1+4) at 100° C. is measured according to Standard ASTM D-1646 with an oscillating consistometer. The Mooney viscosity measurement is carried out according to the following principle: the sample, analysed in the raw state (i.e., before curing), is moulded (shaped) in a cylindrical chamber heated to a given temperature (for example 35° C. or 100° C.). After preheating for one minute, the rotor rotates within the test specimen at 2 revolutions/minute and the working torque for maintaining this movement is measured after rotating for 4 minutes.

4. Method for Measuring the Amount of Polypropylene PP Grafted, by NMR

The amount of polypropylene grafted is determined by NMR with magic angle spinning (HR-MAS) in a solvent for the diene elastomer before the grafting reaction, for example deuterated chloroform. The samples (approximately 10 mg of elastomer) are introduced into a rotor with 90 µl of deuterated chloroform. The spectra are acquired on a Bruker Avance 500 MHz spectrometer fitted with a Bruker dual 1H/13C HRMAS z-grad 4 mm probe. The quantitative $^1$H NMR experiment uses a 30° single pulse sequence and a repetition time of 5 seconds between each acquisition. 128 accumulations are carried out at ambient temperature.

This method makes it possible to differentiate the free polypropylene from the grafted polypropylene; indeed, only the grafted polypropylene is observed. It is verified beforehand, on an unreactive control mixture containing a polypropylene which differs from the polypropylene used in the grafting reaction in that it is not functional and the diene matrix, that no polypropylene signal is observed.

The following signals corresponding to the grafted polypropylene are observed:

—CH— subunits (δ1H=1.54 ppm, δ13C=28.9 ppm),
  —CH2-subunits (δ1H=1.17 and 0.78 ppm, δ13C=45.4 ppm)
—CH3 subunits (δ1H=0.83 ppm, δ13C=20.1 ppm).

The signals of the polypropylene protons are integrated between 0.9 and 0.4 ppm counting at 4 protons, after subtracting the signals resulting from the diene matrix which are present in this region (terminal CH3s).

5. Mechanical Tests:

The stress at break (MPa) and the elongation at break (%) are measured by tensile tests according to French standard NF T 46-002 of September 1988. All these tensile measurements are carried out under the standard conditions of temperature (23±2° C.) and hygrometry (50±5% relative humidity), according to French standard NF T 40-101 (December 1979). The measurements are carried out on H2 test specimens at a pull speed of 500 mm/min. The deformation is measured by following the crosshead displacement.

6. Method for Measuring the Dynamic Properties

The dynamic properties of the materials (G' and tan δ) were measured on a DMA+450 from Metravib with sinusoidal shearing at a frequency of 10 Hz and at a temperature of 23° C. The measurements are carried out with imposed deformation, carrying out an outward and return strain sweep from 0.1 to 50%. The test specimens used consist of two discs of material 10 mm in diameter and 2 mm thick, adhesively bonded between metal cylinders 10 mm thick and 10 mm in diameter, with a cyanoacrylate-type adhesive. Prior to this, the samples are moulded at 160° C. (diameter 25 mm, thickness 2 mm) for 5 minutes, then cut using a punch to a diameter of 10 mm.

The modulus of elastic conservation G', the viscous modulus G" and the loss factor tan δ are measured.

7. Method for Measuring the Degree of Crystallinity

The standard ISO 11357-3:2011 is used to determine the temperature and enthalpy of fusion and of crystallization of the polymers used by differential scanning calorimetry (DSC). The reference enthalpy of the PP is 148 J/g (according to Polymer 43 (2002), 2671-2676).

Exemplary Embodiment

The following abbreviations are used:
Elastomer A diene eastomer comprising glycidyl functions
PPanh chain-end anhydride functional polypropylene
TPE product of the reaction for grafting the polypropylene onto the ethylene-based elastomer
% 1,2 PB: molar content of 1,2-(vinyl) subunits
% 1,4 PB: molar content of 1,4-subunits
% rings: molar content of cyclic subunits
The copolymer obtained by grafting of a diene elastomer and of polypropylene is used in the following examples.

The diene elastomer is a copolymer of 1,3-diene units and of ethylene units modified by 3-(glycidoxy)propyltetradimethylsilane to obtain pendent epoxide functions.

The properties of this elastomer are given in the following table:

TABLE 1

| Before modification by hydrosilylation | |
|---|---|
| MICROSTRUCTURE | |
| Mol % Ethylene: | 68.0% |
| % 1,2 PB: | 8.4% |

TABLE 1-continued

| Before modification by hydrosilylation | |
| --- | --- |
| % 1,4 PB: | 13.4% |
| % rings: | 10.2% |
| SEC | |
| Mn (g/mol): | 164044 |
| Mw (g/mol): | 283095 |
| Viscosity | |
| Mooney viscosity ML 1 + 4 | 32 |
| After modification by hydrosilylation Functionality | |
| epoxide (NMR) | 8.8 mol % |

Rigid grafts: Chain-end maleic anhydride-functional isotactic polypropylene (Baker & Hughes X-10082 Polypropylene Maleic Terminated Polymer), having the following properties:

TABLE 2

| Mn (g/mol) (PE standard) | PI | Melting point (DSC, ° C.) | Crystallinity |
| --- | --- | --- | --- |
| 2250 | 2.31 | 136.62 (method BWM116) | 59.8% (ISO 11357-3: 2011) |

The TPE grafted copolymers are produced by introducing the elastomer A into a microextruder (DSM Xplore) heated to the temperature given in table 3, then anhydride-terminated polypropylene (PPanh) approximately 1 minute later. The screw rotary speed is from 100 to 200 revolutions per minute. This microextruder contains a loop for recirculating molten material, to adjust the residence time. The residence time is fixed at 20 min maximum. The volume of the extruder is fixed at 15 cm$^3$ filled with a total of 13.5 g of material.

The amounts by weight (in grams) of elastomer A and PPanh introduced into the extruder are given in the following table:

TABLE 3

| | Fractions by weight | | |
| --- | --- | --- | --- |
| | ML1 | ML2 | ML3 |
| Elastomer A | 90 | 80 | 70 |
| PPanh | 10 | 20 | 30 |
| Temperature (° C.) | 180 | 210 | 180 |
| Screw rotary speed (rpm) | 100 | 200 | 100 |

The HR-MAS NMR analysis makes it possible to quantify the PPanh grafted onto the Elastomer A backbone. The analyses presented in the table below show up to 29% of PP grafted, for ML2:

TABLE 4

| Fractions by weight | % by weight of PPanh introduced | Grafting reaction yield (PP grafted onto PPanh introduced) |
| --- | --- | --- |
| ML1 | 10 | 12% |
| ML2 | 20 | 29% |
| ML3 | 30 | 18% |

Given the amount of elastomer grafted, these results correspond to a content of PP in the TPE of at least 5%.

The mechanical properties with large deformations are measured and reported in the following table:

TABLE 5

| | Stress at break (MPa) | Elongation at break (%) |
| --- | --- | --- |
| ML1 | 0.6 | 290 |
| ML2 | 3.6 | 230 |
| ML3 | 2.6 | 150 |

Figure 2:
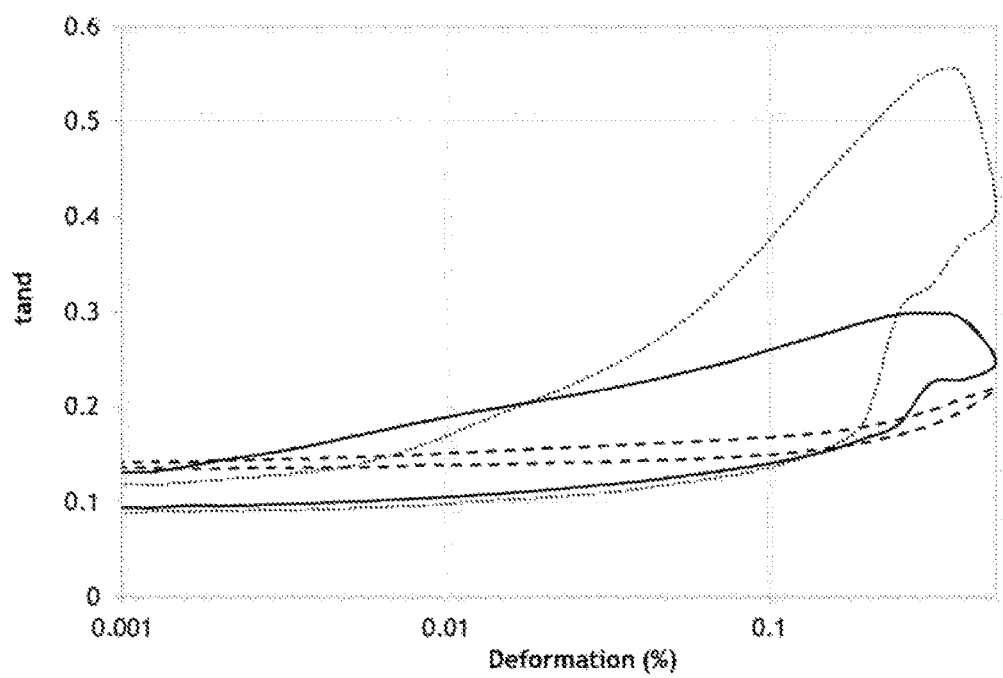
FIG. 2: loss factor (tan δ) as a function of deformation (%)
Dashed line: ML1, dotted line: ML2, solid line: ML3

The dynamic properties of the materials, elastic modulus (G') and loss factor (tan δ), are presented on the curves of FIGS. 1 and 2.

The values of G' (MPa) with 0.1, 10 and 50% deformation on the return cycle are presented in the following table:

TABLE 6

| Deformation (%) | ML1 G' (MPa) | ML2 G' (MPa) | ML3 G' (MPa) |
| --- | --- | --- | --- |
| 0.1 | 1.6 | 3.7 | 5.8 |
| 10 | 1.2 | 1.7 | 2.4 |
| 50 | 0.9 | 1.4 | 1.8 |

The values of tan(δ) with 0.1, 10 and 50% deformation on the return cycle are presented in the following table:

TABLE 7

| Deformation (%) | ML1 tan (δ) | ML2 tan (δ) | ML3 tan (δ) |
| --- | --- | --- | --- |
| 0.1 | 0.14 | 0.08 | 0.1 |
| 10 | 0.15 | 0.14 | 0.14 |
| 50 | 0.22 | 0.41 | 0.25 |

A reinforcement (increase in G') of the materials is observed which is proportional to the amount of PPanh introduced into the extruder.

The value of tan(δ) at 23° C. with 10% deformation is representative of the rolling resistance performance of a tire material. For all these materials, the value is below 0.15 for a rigidity of between 1 and 2 MPa.

The invention claimed is:

1. A diene/polypropylene thermoplastic elastomer copolymer, comprising a backbone, said backbone being derived from a diene elastomer, and from 5% to 50% by weight, relative to the total weight of the copolymer, pendent semicrystalline polypropylene groups distributed along the backbone.

2. A thermoplastic elastomer copolymer according to claim 1, wherein the semicrystalline polypropylene groups are grafted to the backbone.

3. A thermoplastic elastomer copolymer according to claim 2, wherein the copolymer is obtained by reaction:
of a diene elastomer A comprising pendent functional groups along said elastomer, which are able to react with an end group of the polypropylene; and
of semicrystalline polypropylene functionalized by an end group able to react with the pendent functional groups of the diene elastomer A.

4. A thermoplastic elastomer copolymer according to claim 3, wherein the pendent functional groups along said diene elastomer A, which are able to react with the end group of the polypropylene, are epoxide groups.

5. A thermoplastic elastomer copolymer according to claim 3, wherein the diene elastomer A is the product of the copolymerization of at least one conjugated diene monomer and at least one monomer bearing one of said pendent functional groups.

6. A thermoplastic elastomer copolymer according to claim 3, wherein the diene elastomer A is the product of the functionalization by grafting of a diene elastomer B.

7. A thermoplastic elastomer copolymer according to claim 6, wherein the pendant functional groups of the diene elastomer A are epoxide groups, and the epoxide groups are attached to the diene elastomer A via a silicon atom.

8. A thermoplastic elastomer copolymer according to claim 7, wherein said epoxide groups each corresponds to the following formula I:

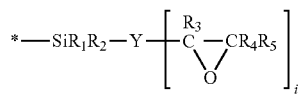

Formula I where
R$_1$ and R$_2$, which are identical or different, each represent a C$_1$-C$_5$ alkyl, C$_6$-C$_{14}$ aryl, or C$_7$-C$_{11}$ aromatic alkyl group;
R$_3$, R$_4$ and R$_5$, which are identical or different, each represent a hydrogen atom or a C$_1$-C$_5$ alkyl, C$_6$-C$_{14}$ aryl, or C$_7$-C$_{11}$ aromatic alkyl group;
Y is a bridging group with a valency equal to i+1; and
i is an integer with a value from 1 to 3;
* denotes an attachment point to the elastomer chain.

9. A thermoplastic elastomer copolymer according to claim 6, wherein the diene elastomer B contains butadiene or 2-methyl-1,3-butadiene.

10. A thermoplastic elastomer copolymer according to claim 6, wherein the diene elastomer B is a homopolymer of 1,3-diene.

11. A thermoplastic elastomer copolymer according to claim 6, wherein the diene elastomer B is a random copolymer resulting from the polymerization of one or more 1,3-dienes with one or more compounds chosen from aliphatic α-monoolefins, aromatic α-monoolefins and ethylene.

12. A thermoplastic elastomer copolymer according to claim 11, wherein the diene elastomer B is a random copolymer resulting from the polymerization of at least one or more 1,3-dienes and ethylene.

13. A thermoplastic elastomer copolymer according to claim 12, wherein the elastomer B comprises units which have, as subunit, a divalent hydrocarbon-based ring containing 6 carbon atoms, of 1,2-cyclohexane type.

14. A thermoplastic elastomer copolymer according to claim 12, wherein the diene elastomer B comprises the following units UA, UB, UC and UD, distributed randomly within the elastomer,
UA) —CH$_2$—CH$_2$— according to a molar percentage of m %;
UB) —CH$_2$—R$_6$C=CR$_7$—CH$_2$— according to a molar percentage of n %;
UC)

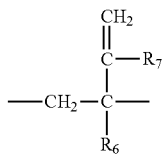

according to a molar percentage of o %;
UD)

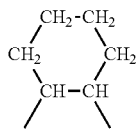

according to a molar percentage of p %;
R$_6$ and R$_7$, which are identical or different, each represent a hydrogen atom, a methyl radical or a phenyl radical which is unsubstituted or substituted in the ortho, meta or para position by a methyl radical;
m≥50;
0<o+p≤25;
n+o>0;
n is a number ranging from 0 to 100;
o and p are numbers ranging from 0 to 25; and
the respective molar percentages of m, n, o and p being calculated on the basis of the sum of m+n+o+p, which is equal to 100.

15. A thermoplastic elastomer copolymer according to claim 12, wherein the diene elastomer B comprises units UA, UB, UC, UD and UE distributed randomly within the elastomer:
UA) —CH$_2$—CH$_2$— according to a molar percentage of m %;
UB) —CH$_2$—R$_6$C=CR$_7$—CH$_2$— according to a molar percentage of n %;
UC)

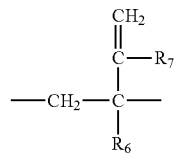

according to a molar percentage of o %;
UD)

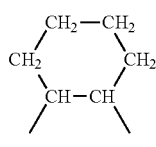

according to a molar percentage of p %;

UE)

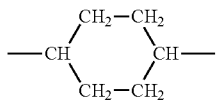

according to a molar percentage of q %;
R$_6$ and R$_7$, which are identical or different, each represent a hydrogen atom, a methyl radical or a phenyl radical which is unsubstituted or substituted in the ortho, meta or para position by a methyl radical;
m≥50;
0<o+p≤25;
n+o>0;
n is a number ranging from 0 to 100;
o and p are numbers ranging from 0 to 25;
o+p+q≥10;
q≥0; and
the respective molar percentages of m, n, o, p and q being calculated on the basis of the sum of m+n+o+p+q, which is equal to 100.

16. A thermoplastic elastomer copolymer according to claim 12, wherein the diene elastomer B comprises units UA, UB, UC, UD, UF, and optionally UE distributed randomly within the elastomer:
UA) —CH$_2$—CH$_2$— according to a molar percentage of m %;
UB) —CH$_2$—R$_6$C=CR$_7$—CH$_2$— according to a molar percentage of n %;
UC)

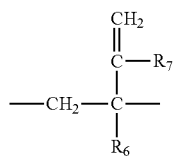

according to a molar percentage of o %;
UD)

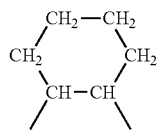

according to a molar percentage of p %;
UE)

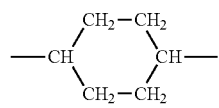

according to a molar percentage of q %;

UF)

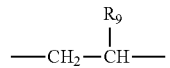

according to a molar percentage of r %;
R$_6$ and R$_7$, which are identical or different, each represent a hydrogen atom, a methyl radical or a phenyl radical which is unsubstituted or substituted in the ortho, meta or para position by a methyl radical;
R$_9$ denoting an alkyl radical having from 1 to 4 carbon atoms or an aryl radical;
m≥50;
0<o+p≤25;
n+o>0;
n being a number ranging from 0 to 100;
o and p being numbers ranging from 0 to 25;
o+p+q≥10 when the diene elastomer also comprises unit UE;
q≥0 when the diene elastomer also comprises unit UE;
0≤r≤25;
the respective molar percentages of m, n, o, p and r, and optionally q, being calculated on the basis of the sum of m+n+o+p+r+optionally q, which is equal to 100.

17. A thermoplastic elastomer copolymer according to claim 2, wherein the grafts are derived from maleic monoanhydride-terminated isotactic polypropylene polymers.

18. A thermoplastic elastomer copolymer according to claim 2, wherein the grafts are derived from semicrystalline polymers having a number-average molar mass of less than 10,000 g/mol, and a melting point ranging from 100° C. to 180° C.

19. A thermoplastic elastomer copolymer according to claim 1, wherein the diene elastomer A has a number-average molar mass ranging from 10 kg/mol to 500 kg/mol.

20. A process for producing a copolymer according to claim 1, comprising the reaction:
of a diene elastomer A comprising units resulting from the polymerization of a conjugated diene and also comprising functions which are able to react with an end group of the polypropylene, which are pendent along the chain;
of semicrystalline polypropylene functionalized by an end group able to react with the functions present on the diene elastomer A,
in proportions by weight of diene elastomer A/semicrystalline polypropylene ranging from 60/40 to 95/5 in solution, or by bringing into contact in the melt state, in the absence of solvent.

21. A process according to claim 20, wherein one or more catalysts for a grafting reaction are also introduced.

22. A composition comprising a mixture obtained by the process according to claim 20.

23. A composition comprising at least 50% by weight of a thermoplastic elastomer copolymer according to claim 1.

24. A tire, one of the constituent elements of which comprises a composition according to claim 23.

* * * * *